United States Patent Office 3,359,199
Patented Dec. 19, 1967

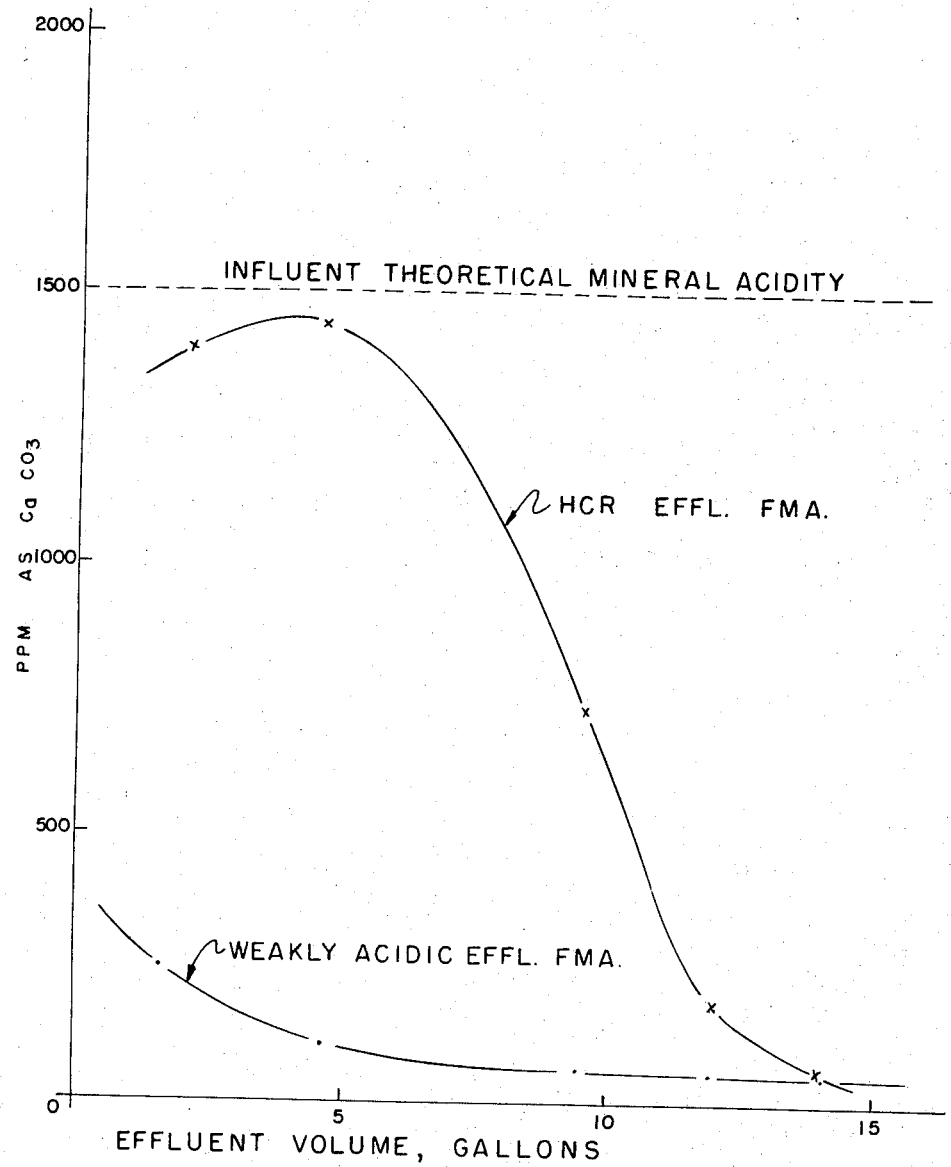

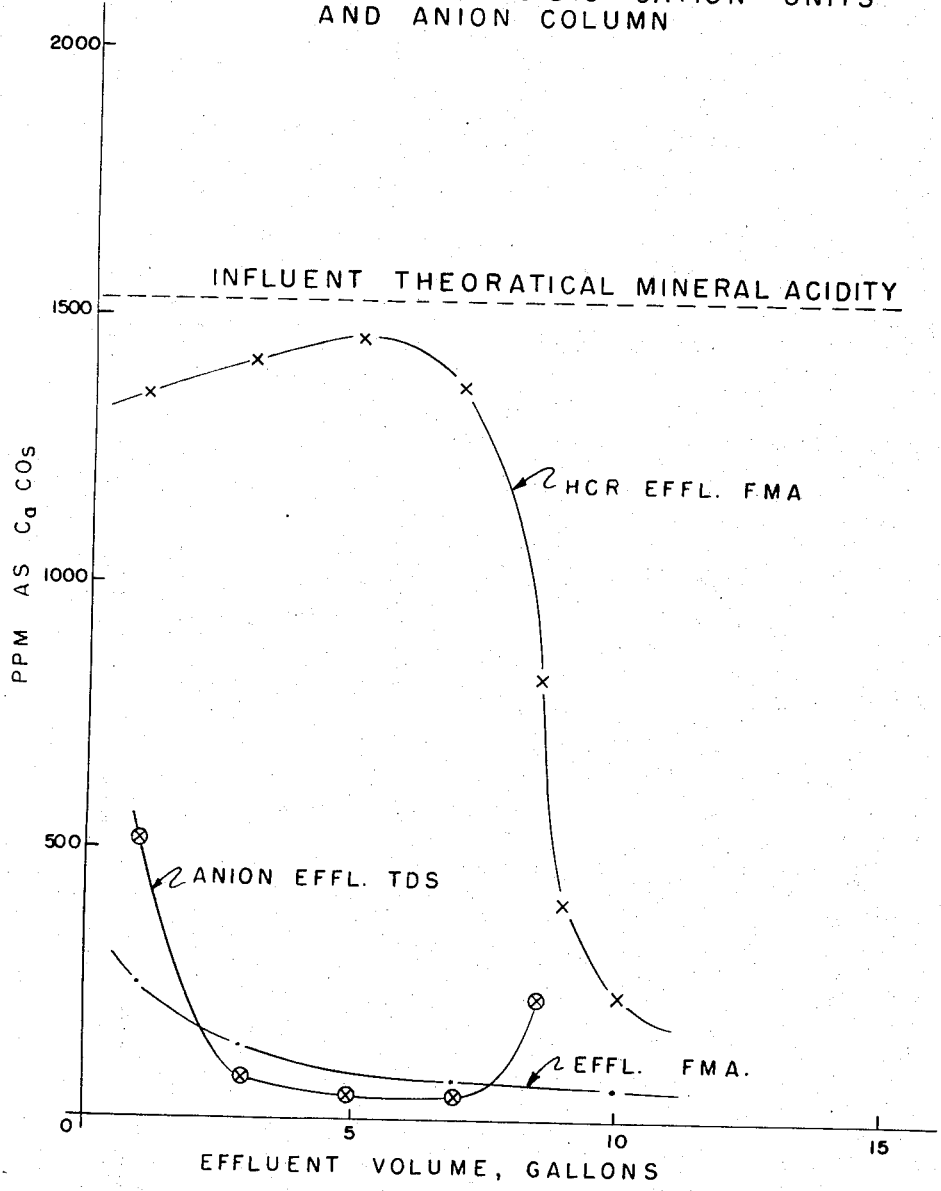

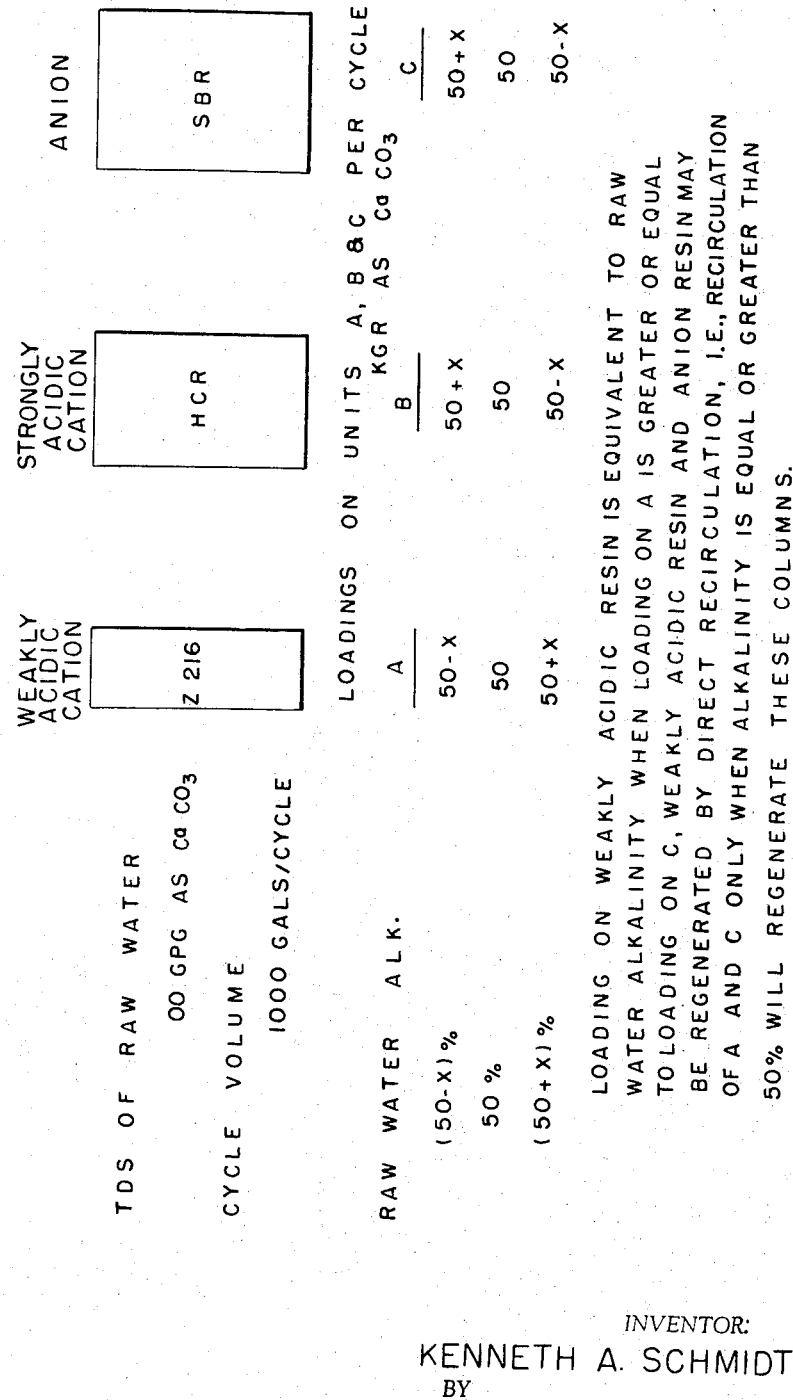

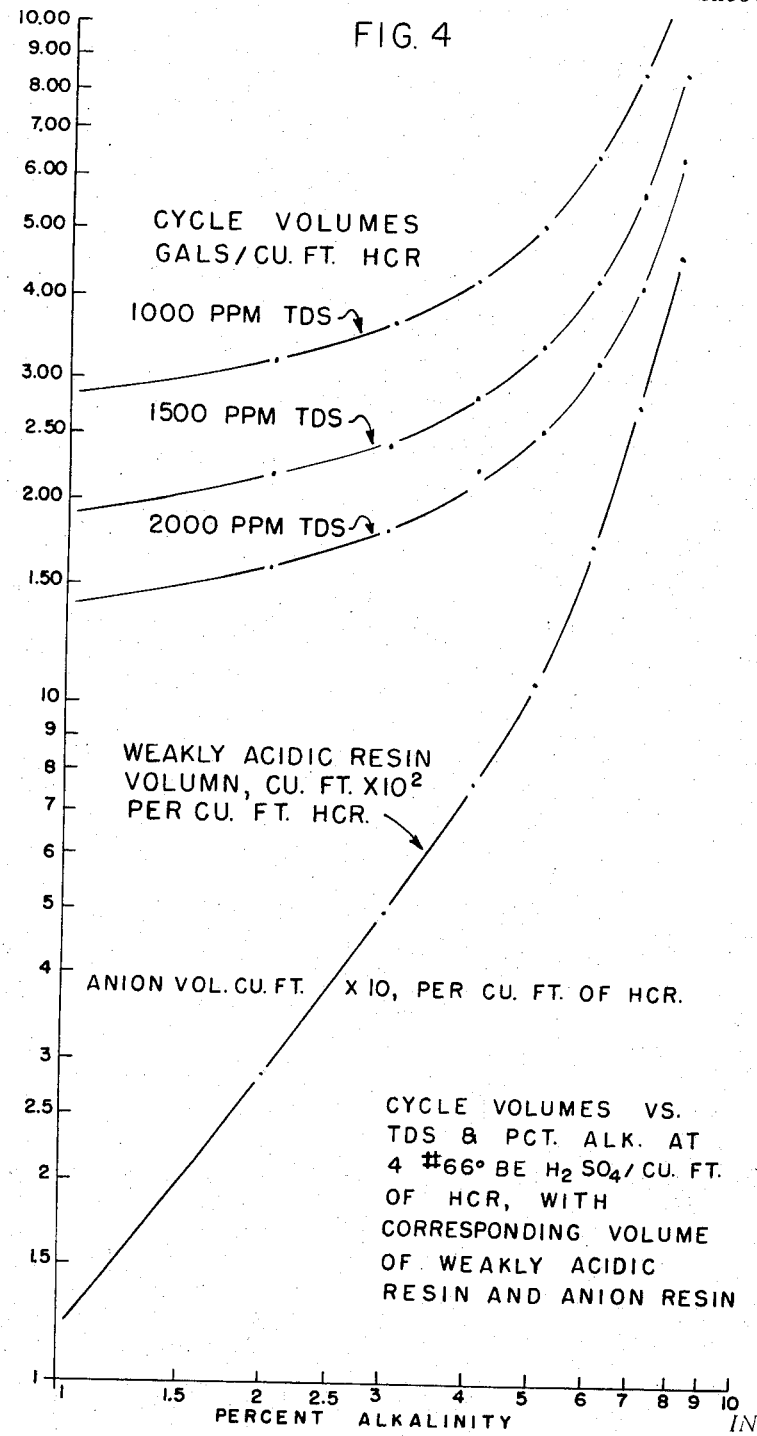

3,359,199
PROCESS FOR DEMINERALIZATION OF POLAR LIQUIDS, ESPECIALLY WATER
Kenneth A. Schmidt, Chicago Ridge, Ill., assignor to Nalco Chemical Company, Chicago, Ill., a corporation of Delaware
Filed Dec. 28, 1964, Ser. No. 421,418
7 Claims. (Cl. 210—24)

This invention relates to an improved process for demineralizing water or other polar liquids with ion exchange resins. In particular, the invention is directed to a liquid demineralization or purification process utilizing a multi-bed ion exchange system, one bed being a weak acid cation exchange resin, a second bed being a cation exchange resin in the hydrogen form, and a third being an anion exchange resin in the polyvalent salt form.

Under present practice water is usually demineralized with an ion exchange system consisting of a cation exchange resin in the hydrogen form and an anion exchange resin in the hydroxide form. The hydrogen ions of the cation resin are exchanged with the metal cations in the raw water, primarily sodium, magnesium and calcium, while the anions in the raw water are exchanged for the exchangeable hydroxide group of the anion exchange resin. The ultimate result of this dual resin treatment is the replacement in the water of the anions and cations by $H^+$ and $OH^-$.

An improved water treatment process is disclosed in my copending application Ser. No. 262,244, which was filed on Mar. 1, 1963, the disclosure of which is incorporated herein by reference. In this process, an anion exchange resin in the sulfate form is substituted for the anion exchange resins in the hydroxide form of the prior art. The resultant ion exchange system has several distinct advantages over the prior art hydrogen-hydroxide system all of which are fully explained in the aforementioned copending application. In general, the hydrogen-cation, sulfate-anion exchange resin system disclosed in my copending application has an advantage in that only one regenerant need be used to regenerate the exhausted resins to the hydrogen and sulfate forms. This regenerant may be spent or fresh aqueous sulfuric acid, the cation of which regenerates the cation resin to the hydrogen form and the anion of which converts the anion resin to the bisulfate form. The bisulfate form can then be converted to the sulfate form by rinsing with raw water of low solids or with demineralized water. In accordance with a special feature of my prior invention, the conversion of the anion exchange resin from the bisulfate form to the sulfate form may be accelerated by the incorporation into the rinse water of a small amount of a base, such as sodium hydroxide, sodium carbonate, or preferably, aqueous ammonia.

Another advantage of the hydrogen form and sulfate form ion exchange resin system is that the ion exchange resin in sulfate form undergoes considerably less volume change in the conversion of the resin from the sulfate form to the chloride form, bisulfate form, bicarbonate form, etc., and vice versa, in the regeneration and exhaustion cycles than does the anion exchange resin in the conversion from the hydroxide form to the chloride, bisulfate, sulfate, bicarbonate, etc. form and vice versa. The larger alternating expansion and contraction of the anion exchange resin in the latter form considerably reduces the bed life of the ion exchange resin as a result of the weakening of the resin structure during the alternating expansion and contraction. Furthermore, in anion exchange apparatus, such as the Higgins reactor in which the anion exchange resin is relatively tightly packed in confined zones of the apparatus, i.e., the individual ion exchange, regenerant, and rinsing zones, the larger volume change of the hydroxide-type anion exchange resin creates greater pressures upon the resin beads when the resin expands, thereby further accelerating the degradation of the resin structure.

The present invention is directed to an improvement in my hydrogen form-sulfate form ion exchange resin system which represents still a further improvement over the prior art hydrogen form-hydroxide form resin systems. These improvements are particularly noticeable where the feed water or liquid is of high alkalinity. Conditions of high alkalinity are very often encountered in brackish water treatment processes.

It is an object of the present invention, therefore, to provide an improvement in my previously disclosed hydrogen form-sulfate form ion exchange resin system.

Another object of the invention is to provide an ion exchange system for the demineralization or deionization of polar liquids, especially water, which can be carried out to great advantage on liquids of high alkalinity.

Still another object of the invention is to provide an improved ion exchange process for removing cations associated with alkalinity in a brackish water.

Another object of the invention is to provide an improvement in my previously disclosed process which can be carried out without any substantial increase in cost or with an actual decrease in the overall operating cost of the process.

Other objects will become apparent to those skilled in the art from the following detailed description of the invention.

In general, the present invention comprises the discovery that a multi-bed system (usually a three-bed system), which includes a weak acid cation exchange resin, a strong acid cation exchange resin, and an anion exchange resin in the polyvalent salt form and preferably the sulfate form, provides a highly efficient and advantageous system for removing ions from brackish waters, and the like, of high alkalinity. In a preferred embodiment, the process is carried out utilizing three separate resin beds.

The ion exchange systems of the invention, like other ion exchange systems known in the art, are equilibrium systems both in the ion exchange or resin exhaustion phase of the process and in the regeneration phase of the process. In my process, ion exchange resins are brought into contact with water or other polar liquid to be demineralized or deionized. The resin particles or beads may be slurried with the water or other polar liquid to be treated, although the more common procedure is to employ the resins in the form of beds through which the water or other polar liquid is passed and thereby brought into contact with the ion exchange resins.

The most predominant cations in raw waters, i.e., river water, lake water, well water, and the like, are sodium, calcium, and magnesium. In some instances, potassium and iron ions are also present in substantial amounts. The most commonly encountered anions in raw water are chloride, sulfate, bicarbonate and nitrate. These anions and cations, as well as any other anions or cations present in raw waters, can be effectively removed by the ion exchange system of the present invention.

Briefly, the anion exchange resins used in the practice of the invention are strongly basic anion exchange resins, i.e., anion exchange resins which in the hydroxide form are capable of converting inorganic salts in aqueous solution directly to hydroxides. Thus, a strongly basic anion exchange resin is capable of converting an aqueous solution of sodium chloride directly to an aqueous solution of sodium hydroxide. A strongly basic anion exchange resin can also be defined as one which on titration with hydrochloric acid in water free from electrolytes has a pH above 7.0 when the amount of hydrochloric acid added is one-half of that required to reach the inflection point (equivalence point). A weekly basic anion exchange resin under the same conditions has a pH below 7.0 when one-half of the acid required to reach the equivalence point has been added. The strongly basic anion exchange resins which are available commercially are characterized by the fact that the exchangeable anion is a part of a quaternary ammonium group. The quaternary ammonium group has the general structure:

wherein $R_1$, $R_2$ and $R_3$ represent alkyl or substituted alkyl groups, and $X^-$ is a monovalent anion.

Examples of the strongly basic anion exchange resins which can be employed in the practice of the invention are those resins disclosed in U.S. Patents 2,591,573, 2,597,440, 2,597,494, 2,614,099, 2,630,427, 2,632,000 and 2,632,001.

The strongly basic insoluble anion exchange resins which are preferably employed for the purpose of the invention are reaction products of a tertiary alkyl amine and a vinyl aromatic resin having halo methyl groups attached to aromatic nuclei in the resin and subsequently converted to the sulfate. Another class of strongly basic anion exchange resins suitable for the practice of the invention are the reaction products of tertiary carboxylic or heterocyclic amines and vinyl aromatic resins having halo methyl groups attached to aromatic nuceli in the resin and subsequently converted to the sulfate.

The vinyl aromatic resins employed as starting materials in making the anion exchange resins employed in the preferred practice of the invention are the normally solid benzene-insoluble copolymers of a monovinyl aromatic compound and a polyvinyl aromatic compound containing from 0.5 to 40% by weight, preferably from 0.5 to 20% by weight of the polyvinyl aromatic compound, chemically combined with 99.5% to 60% by weight of the monovinyl aromatic compound. Examples of suitable monovinyl aromatic compounds are styrene, alpha methyl styrene, chlorostyrenes, vinyl toluene, vinyl naphthalene, and homologues thereof, capable of polymerizing as disclosed, for example, in U.S. Patent 2,614,099. Examples of suitable polyvinyl aromatic compounds are divinyl benzene, divinyl toluene, divinyl xylene, divinyl naphthalene and divinyl ethyl benzene. These resins are halo methylated as described, for instance, in U.S. Patent 2,614,099, preferably to introduce an average of 0.2 to 1.5 halo methyl groups per aromatic nucleus in the copolymer and then reacted with a tertiary amine to introduce a quaternary ammonium anion exchange group. Examples of suitable tertiary amines are trimethyl amine, triethyl amine, tributyl amine, dimethyl propanol amine, dimethyl ethanol amine, methyl diethanolamine, 1-methyl-amino-2,3-propane diol, dioctyl ethanolamine, and homologues thereof.

The anion exchange resins can also be prepared by halogenating the molecule of the resin and then introducing an anion exchange group as described in U.S. Patent 2,632,000 and subsequently converting them to the sulfate, with or without admixture with the hydroxide form of the resin. In place of the sulfate form the anion exchange resin can be in the form of other polyvalent salts such as chromate-bichromate, phosphate-biphosphate, sulfite-bisulfite, etc.

The preferred anion exchange resins used as starting materials in practicing the invention are Nalcite SAR and Nalcite SBR. Nalcite SBR is a styrene-divinylbenzene resin containing quaternary amine ion exchange groups in which the three R groups are methyl groups. This resin consists of spherical particles of 20 to 50 mesh and containing about 40% water. The divinylbenzene content is approximately 7.5%. The total exchange capacity is approximately 1.2 equivalents per liter, wet volume. The Nalcite SAR is similar to the Nalcite SBR except that one of the methyl groups in the quaternary amine salt structure is replaced by a hydroxy ethyl group. The Nalcite SBR is somewhat more basic than the Nalcite SAR.

The strong acid cation exchange resin provides exchangeable hydrogen ions. Resins of this nature are known in the prior art, one of the most common types thereof being a sulfonated resin. Nalcite HCR-W is a sulfonated styrene divinyl benzene strongly acid cation exchanger of the type described in U.S. Patent 2,366,007.

Another suitable type of hydrogen form cation exchange resin is a sulfonic acid phenol-formaldehyde resin such as a resin derived by condensing a phenol sulfonic acid with formaldehyde. In general, resins having a plurality of sulfonic acid groups are the most suitable strong acid cation exchange resins for purposes of this invention.

The weak acid resins that are used in the present process comprise the present commercially available weakly acidic type resins containing carboxylic groups as the functional sites. These acids are analogous to weakly basic resins in most respects. The weak acid resins are operable at a pH above 5.5 and do not split salts of strong acids. One available product is identified by the trademark Zerolit 216. According to an article by A. Hinsley, Procle 23$^d$ An. Water Conf. Engr. Soc. of Western Pennsylvania, October 1962. Zerolit 216 is a condensation product containing both phenolic and carboxylic groups. This resin can remove sodium carbonate from water. If polyvalent cations are present, however, the resin is more selective for polyvalent ions such as calcium and magnesium than monovalent ions such as sodium or potassium. Zerolit 216 was used in the tests set out in the subject specification. It should be kept in mind, however, that other weak acid ion exchange resins can be used in the subject process.

The acid efficiency, i.e., kgr. exchange capacity per pound of acid used in regeneration of the cation exchangers is much improved utilizing a carboxylic type weakly acidic exchanger in series with a strong acid exchanger and an anion exchanger over the efficiency of the two-bed system disclosed in my prior application. It is possible by the subject process, therefore, to remove alkalinity associated with brackish waters without substantially increasing the cost of the overall process. It has been found that 100% acid utilization can be obtained with raw waters having 45% alkalinity. In waters with an alkalinity below 45% the overall acid utilization will be less than 100% causing the production of waste acid, but the efficiency will still be improved over that of the two-bed system. As an example, acid efficiencies in the range of 4.6–5.4 kgr. per pound of acid can be obtained on a water having approximately 1800 p.p.m. TDS and 15.75% alkalinity. This is equivalent to an overall acid utilization ranging from 67.3% to 79.4%. The acid utilization for the strongly acidic resin alone, calculated from the same test runs, gave corresponding values ranging from 47.0% to 64.0%. With very high alkalinity waters (above 45%) acid supplementation (above the amount required for regeneration of the strongly acid resin) is usually required.

In order to demonstrate my improved process, numerous tests were made utilizing the three-bed systems. The results were graphically recorded as shown in the attached drawing. In these tests the procedure was as follows:

(1) Resin and column data

Three columns were used in the tests which were made up as follows:

|  | Column No. 1 | Column No. 2 | Column No. 3 |
|---|---|---|---|
| Type of Resin | Cation Weak Acid | Cation Strong Acid | Anion Strong Acid. |
| Brand | Zerolit 216 | HCR | SBR. |
| Lot No | | 03131-2 | |
| Col. Diam., inches | 1 | 1 7/16 | 3. |
| Bed Depth, inches | 39 | 39 | 42. |
| Bed Vol., ml | 500 | 1,070 | 4,800. |

75 ml. beds of SBR were used in the tests to determine the effect of sulfate regeneration.

(2) Analytical data

All determinations of FMA, M-alk. chlorides, and hardness were made by standard titration procedures. Sulfates were determined by means of a standard phototester method. Theoretical mineral acidity was determined by decationizing the sample in a small column of HCR–W (approximately 50 ml. bed) and titrating the effluent for FMA.

(3) Operation

Brackish water was prepared for test purposes as follows:

A supply tank was filled with a highly concentrated solution of salts wanted in the brackish water. The supply tank was connected to a 35 gallon make-up tank fitted with a conductivity probe. As the brackish water was withdrawn, a constant tap valve connected to Chicago tap water source was activated to maintain a given level in the tank. When the salt concentration fell below the desired level as indicated by the conductivity probe, a solenoid was activated and concentrated brine from the supply tank was passed to the make-up tank. In these tests the rate at which the brackish water was passed through the columns was 5 gallons per minute per square foot of bed area.

The regeneration of the cation exchangers was carried out by passing 2 lbs. of $H_2SO_4$, at 2%, per cu. ft. of HCR, followed by 2 lbs. per cu. ft. HCR at 4% through both columns. The columns were operated in series, with the acid passing through the HCR bed first. The columns were then slow rinsed with raw water in the same order. Fast rinse and the exhaustion run were carried out with the columns in the reverse order.

RESULTS AND DISCUSSION

Cation regeneration

In the attached drawing, FIGS. 1 and 2 show the free mineral acidities obtained from the weak acid resin bed (Zerolit 216) and the strong acid resin bed (Nalcite HCR) when these are operated in series. FIG. 2 also shows the effluent TDS of the anion exchanger when this unit is operated together with the two cation columns. It will be noted that the weakly acidic column produces free mineral acidity, which indicates the presence of strongly acidic groups in this resin. Boiling the effluent before FMA titration did not change the acidities.

As was pointed out above, the weak acid cation exchanger removes metals associated with alkalinity such as carbonate and bicarbonate. The hydrogen or the carboxyl group is neutralized forming carbon dioxide. As long as divalent cations, such as calcium and magnesium ions, are available the resin has little selectivity from monovalent ions. When the exhausted weak acid exchanger is regenerated with waste $H_2SO_4$, $H^+$ goes on the carboxyl group driving off the $Ca^{++}$ or $Mg^{++}$ ions. The $Ca^{++}$ or $Mg^{++}$ ions attached to $SO_4^=$ to form calcium sulfate or magnesium sulfate which leaves with the effluent. The acid concentration of the effluent is adjusted to avoid precipitation. The effluent should be close to neutral.

The acid efficiency, in terms of kgr. per lb,. of acid used, was determined from FIGS. 1 and 2 as follows:

The total amount of cations removed is equivalent to the area under the HCR effluent FMA curve in addition to the total amount of alkalinity removed. This can best be demonstrated by a sample calculation.

From FIG. 1.—Cycle volume may be based on an end point of 500 p.p.m. leakage, as $CaCO_3$. In cycle 1 this will occur at approximately 8.5 gals. collected.

The area under the HCR effluent FMA curve is approximately 111 cm.$^2$, out to 8.5 gals.
1 cm.$^2$ is equivalent to $1 \times 100/17.1$, equal to 5.85 grains as $CaCO_3$/cm.$^2$.
111 cm.$^2$ is equivalent to 650 grains as $CaCO_3$.
Alkalinity reduction, total, is equal to $8.5 \times 280/17.1$ equals 140 grains as $CaCO_3$.
Total cations removed, cycle 1:

|  | Grains as $CaCO_3$ |
|---|---|
| FMA | 650 |
| Alk | 140 |
| Total | 790 |

Inasmuch as a total of .152 lb. of $H_2SO_4$ was used during regeneration of the two cation columns, the acid efficiency will be $$0.790 \times 1/.152 = 5.2 \text{ kgr./lb. of acid}$$

The capacity of the strongly acidic resin may be calculated from the area between the curves for HCR effluent FMA and Zerolit 216 effluent FMA. On FIG. 1 this area amounts to approximately 88 cm.$^2$, which is equivalent to 516 grains as $CaCO_3$. Since the HCR bed volume is 1070 ml. the operating capacity is $$515 \times 28300/1070 \text{ grains/cu. ft. or } 13.5 \text{ kgr./cu. ft.}$$

It should be noted that this capacity is obtained on an acidic HCR influent and that it probably would be somewhat higher if the column were operated on a neutral water, i.e., without the Zerolit 216 column ahead of it. A capacity of 15.7 kgr./cu. ft. uncorrected for leakage has been obtained on a 1398 p.p.m. TDS water. With the use of the weakly acidic exchanger the total exchange capacity, in terms of kgr. per cu. ft. (of strongly acidic resin only) corrected for leakage, and based on cycle 1, is $$790 \times 28300/1070 \text{ grains/cu. ft. or } 20.85 \text{ kgr./cu. ft.}$$

This is substantial improvement considering that this capacity is corrected for leakage and that no additional acid is used.

One hundred percent acid utilization at 4 lbs. of $H_2SO_4$ per cu. ft. is equivalent to an operating capacity of $4 \times 48/100$ or 27.4 kgr. as $CaCO_3$. Inasmuch as 1 lb. is equivalent to 7000 grains, the maximum acid efficiency one could obtain at 4 lbs. regeneration level is $7 \times 98/100$ or 6.85 kgr./lb. of acid. The overall acid utilization, therefore, on cycle 1, was $5.2 \times 100/6.85$ equals 76%.

The results from cycle 1 is summarized in the following table which also shows the individual capacities of HCR and Zerolit 216. The capacity of the Zerolit 216 was calculated on the basis of the area under the Zerolit 216 effluent FMA curve, out to 17 gallons collected, and the total reduction of the raw water alkalinity. FMA became zero at approximately 17 gals. and M alkalinity started to leak. In other words, the end point for the Zerolit 216 is based on initial breakthrough or zero leakage of alkalinity.

*Capacities, acid utilization and efficiencies from cycle 1*

15% raw water alkalinity.
Regeneration level: 4 lbs. $H_2SO_4$ per cu. ft. of strongly acidic resin.

| | |
|---|---|
| Overall capacity kgr./cu. ft. of HCR | 20.85 |
| Overall acid efficiency kgr./lb. of acid | 5.2 |
| Overall acid utilization percent | 76 |
| Individual capacities kgr./cu. ft.: | |
| For HCR | 13.5 |
| For Z216 | 12.2 |

The general case of loadings on the various exchangers which are used in this process is shown in FIG. 3 as a function of raw water alkalinity. It is assumed there that the weakly acidic resin produces no mineral acidity and that it removes all of the alkalinity.

Cycle volumes on the cation exchangers, as a function of TDS and percent alkalinity are shown on FIG. 4. The volume of the weakly acidic exchanger as a function of percent alkalinity is also shown here in terms of cu. ft. per cu. ft. of HCR.

Acid utilization of 100% may be obtained when ion uptake on the two cation resins is equivalent to the amount of acid used in the regeneration.

If A is percent raw water alkalinity, L the total cation uptake, $P_s$ is the percent acid utilization of HCR and R is the kgr. of acid used in regeneration then the loadings and acid consumptions may be expressed as follows:

*Loadings*

| | |
|---|---|
| HCR | $L \times (100-A)$ |
| Zerolit 216 | $L \times A$ |

*Acid consumptions*

| | |
|---|---|
| HCR | $R \times P_s$ |
| Zerolit 216 | $R(100-P_s)$ |

100% acid utilization is obtained when $A = 100 - P_s$.

The acid utilization of Nalcite HCR operating on a 1500 p.p.m. TDS water is about 55% at a regeneration level of 4 lbs. 66° Bé. $H_2SO_4$ per cu. ft. of resin. This leaves about 45% of the applied acid available for regeneration of the weakly acidic resin, which has an acid utilization of nearly 100% at almost any regenerant level and acid concentration. On waters having 45% alkalinity, therefore, one could get an overall acid utilization of 100%, with 55% of the acid taken up by the sulfonic resin and the remaining 45% utilized by the weakly acidic resin. It is evident, therefore, that with waters having more than 45% alkalinity it will be necessary to increase the acid dosage in order to regenerate fully the weakly acidic resin. On the other hand, a regeneration level of 4 lbs. per cu. ft. of sulfonic resin will yield an excess acid when the raw water contains less than 45% alkalinity and the two cation exchangers are regenerated in series.

*Anion regeneration*

There are a number of ways by which the exhausted anion exchange resin can be regenerated. In my copending application, sulfuric acid is used to regenerate both the strong acid cation exchange resin and the anion exchange resin. In this mechanism the bisulfate of sulfuric acid replaces the chloride ions taken up by the resin to form $R^+HSO_4^-$. The resin is then either washed with a water rinse or with an aqueous alkaline rinse to form $R_2^+SO_4$.

If the alkaline brackish watter has a high sulfate content, the raw water can be used to regenerate the anion exchange resin. Where the sulfate content of the raw water is not sufficient, however, the sulfates content in the effluent leaving the weak acid cation resin can be used to substantial advantage for this purpose. As was pointed out above, the effluent leaving the weak acid cation exchange resin contains calcium sulfate and magnesium sulfate ions. The sulfate ions can be used to displace the chlorides picked up from the raw water by the anion exchange resin. Inasmuch as the anion exchange resin is most selective for sulfates at low concentration, the effluent leaving the weak acid cation exchange resin is diluted with raw water. It has been found that the sulfate content of from 10 to 5,000 p.p.m. of sulfate as sulfate in water is satisfactory. A preferred sulfate content would be from about 50 to 2,000 p.p.m. The sulfates drive off the chlorides of the anion bed leaving the sulfates behind. Magnesium or calcium chloride is then removed as effluent and discarded.

Obviously many modifications and variations of the invention as hereinbefore set forth may be made without departing from the spirit and scope thereof, and therefore only such limitations should be imposed as are indicated in the appended claims.

I claim:

1. A process for demineralizing water which comprises: bringing water containing inorganic salts into contact first with a weak acid cation exchange resin in the carboxylic acid form, and secondly into contact with a cation exchange resin in the hydrogen form, and then in contact with a strongly basic anion exchange resin in the polyvalent salt form, and thereby exchanging the hydrogen of the carboxylic group of the weak acid exchanger for the cations associated with carbonates and bicarbonates, and the hydrogen of the strong acid exchange resin for the cations of mineral salts forming the acids of the anions of said salts, and sorbing the said acids on the anion exchange resin.

2. A process as in claim 1 wherein said strongly basic anion exchange resin is in the sulfate form.

3. A process for demineralizing water which comprises: bringing water containing inorganic salts into contact first with a weak acid cation exchange resin in the carboxylic acid form, and secondly into contact with a cation exchange resin in the hydrogen form, and then in contact with a strongly basic anion exchange resin in the polyvalent salt form, and thereby exchanging the hydrogen of the carboxylic group of the weak acid exchanger for the cations associated with carbonates and bicarbonates, and the hydrogen of the strong acid exchange resin for the cations of mineral salts forming the acids of the anions of said salts, and sorbing the said acids on the anion exchange resin, and regenerating the said cation exchange resin to the hydrogen form by passing a strong mineral acid through said exchange resin, regenerating the weakly acidic cation exchange resin by passing the excess acid from the strongly acidic cation exchange resin through the weakly acidic cation exchange resin, and regenerating the anion exchange resin by passing a solution containing sulfate salts through said anion exchange resin.

4. A process as in claim 3 wherein said strongly basic anion exchange resin is in the sulfate form.

5. A process for demineralizing water which comprises: bringing water containing inorganic salts into contact first with a weak acid cation exchange resin in the carboxylic acid form, and secondly through a cation exchange resin in the hydrogen form, and finally through a strongly basic anion exchange resin in the polyvalent salt form, and thereby exchanging the hydrogen of the carboxylic group of the weak acid exchanger for the cations associated with carbonates and bicarbonates, and the hydrogen of the strong acid exchange resin for the cations of mineral salts forming the acids of the anions of said salts, and sorbing the said acids on the anion exchange resin, and regenerating the anion exchange resin by diluting the effluent from the weak acid cation exchange obtained during regeneration of said resins with raw water to a sulfate content of from 10 to 5,000 p.p.m. sulfate as sulfate and passing this solution containing sulfate salts through said anion exchange resin.

6. A process as in claim 5 wherein the sulfate is present in the solution in an amount varying from 20 to 2,000 p.p.m. sulfate as sulfate.

7. A process as in claim 5 wherein said strongly basic anion exchange resin is in the sulfate form.

References Cited

UNITED STATES PATENTS

| | | | |
|---|---|---|---|
| 2,738,322 | 3/1956 | Bauman et al. | 210—32 |
| 2,772,237 | 11/1956 | Bauman et al. | 210—32 |
| 2,855,363 | 10/1958 | Kittredge | 210—32 X |

JOSEPH SCOVRONEK, *Acting Primary Examiner.*

E. G. WHITBY, *Assistant Examiner.*

UNITED STATES PATENT OFFICE
CERTIFICATE OF CORRECTION

Patent No. 3,359,199                      December 19, 1967

Kenneth A. Schmidt

It is hereby certified that error appears in the above numbered patent requiring correction and that the said Letters Patent should read as corrected below.

Column 3, lines 21 to 25, the formula should appear as shown below:

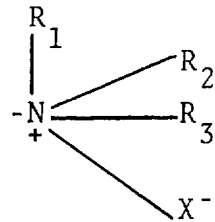

Column 6, line 61, after "is" insert -- a --. Column 7, line 73, "watter" should read -- water --.

Signed and sealed this 4th day of November 1969.

(SEAL)
Attest:

EDWARD M. FLETCHER, JR.                  WILLIAM E. SCHUYLER, JR.
Attesting Officer                           Commissioner of Patents